July 5, 1927.
L. WICKENDEN ET AL
1,634,480
ELECTRIC FURNACE APPARATUS AND PROCESS FOR MAKING DECOLORIZING CARBON
Filed March 22, 1923
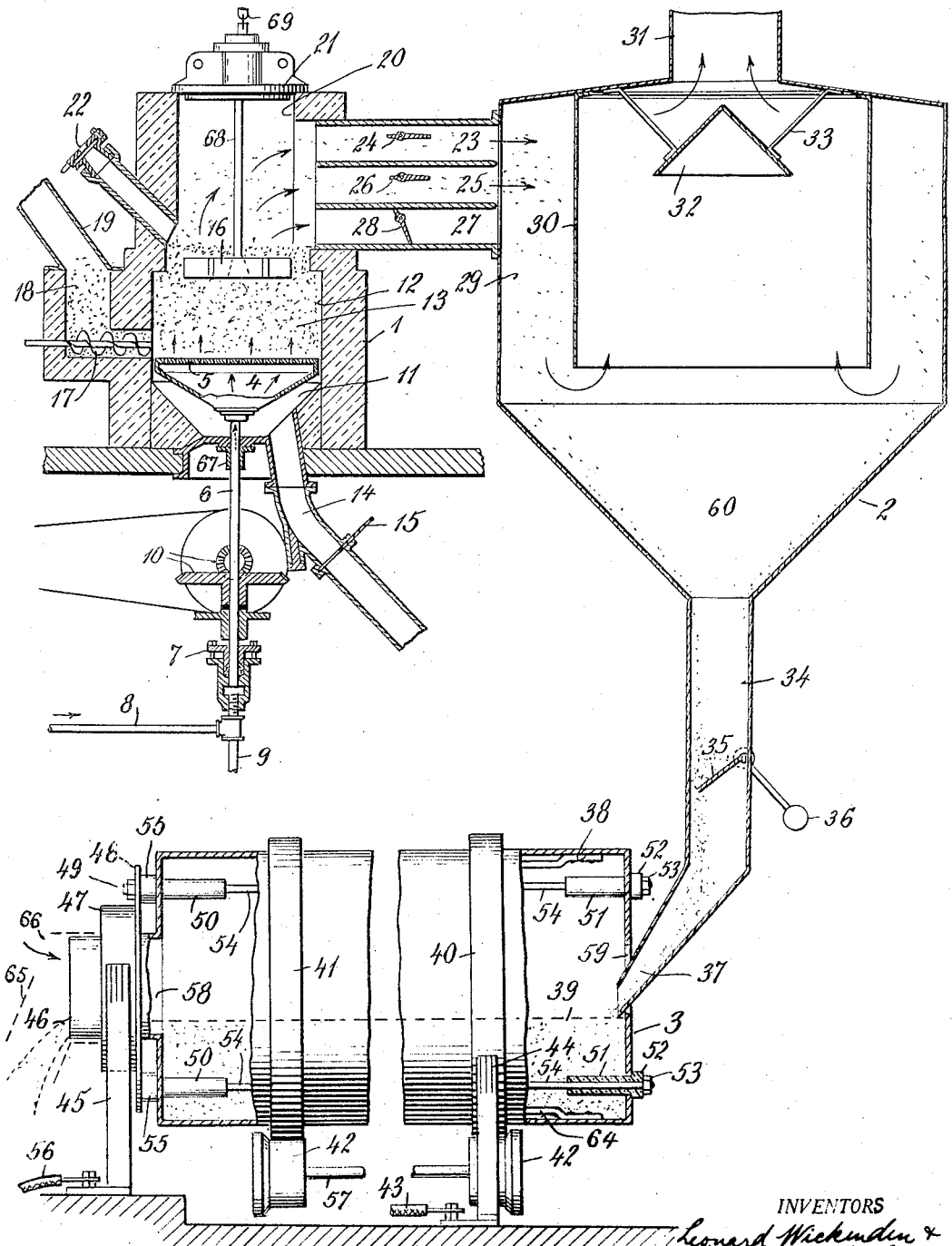
INVENTORS
Leonard Wickenden &
Stanley A. W. O'Kell
BY
Harry L. Duncan
ATTORNEY.

Patented July 5, 1927.

1,634,480

UNITED STATES PATENT OFFICE.

LEONARD WICKENDEN, OF FLUSHING, NEW YORK, AND STANLEY A. W. OKELL, OF TYRONE, PENNSYLVANIA, ASSIGNORS TO INDUSTRIAL CHEMICAL COMPANY, OF NEW YORK, N. Y., A CORPORATION OF NEW YORK.

ELECTRIC-FURNACE APPARATUS AND PROCESS FOR MAKING DECOLORIZING CARBON.

Application filed March 22, 1923. Serial No. 626,935.

This invention relates especially to apparatus and processes for making decolorizing carbon by a multiple heat activating process, the carbon being preferably first heated in any suitable electric or other furnace to high refining temperatures such as 800° C. or more which seems to destroy or remove objectionable hydrocarbons or complex carbon components, and then submitting the carbon to a further lower heat activating treatment in the presence of air or oxidizing gases. For this purpose an electric furnace may be effectively used for the preliminary high heat treatment and the carbon, such as carbonized dissolved vegetable material or other suitable carbon or charcoal, may be electrically heated to high temperatures between about 750 and 950° C. more or less and preferably simultaneously agitated as by steam or gas jets which may be used to progressively carry off the lighter and more completely treated particles of carbon which may by this air separating action be carried out of the furnace into a separator of the centrifugal or cyclone type, for instance. A secondary activating furnace, preferably of an electrically heated rotary kiln type, may be used to receive this initially treated carbon either before or after it has been allowed to cool, and agitate and heat the same at moderate temperatures of 350 to 450° C. more or less in the presence of limited quantities of air or other oxidizing or activating gases which greatly increase the decolorizing value of the carbon with relatively little loss after such a preliminary high temperature treatment.

In the accompanying drawing showing in a somewhat diagrammatic way an illustrative embodiment of the invention in vertical section, the preliminary electric treating or refining furnace 1 may be formed of brick work or other suitable material so as to provide a furnace chamber which is preferably substantially vertical and which may have an inside dimension or diameter of two to four feet more or less, at least throughout the lower part 12, adjacent the heating electrodes. A feed screw 17 may be installed near the bottom of this treating chamber and may communicate with a vertical feed hopper or chamber 18 into which the carbon is fed from the chute 19, so as to accumulate in this hopper and prevent undesirable discharge of steam or gases as the screw 17 gradually feeds the carbon into the furnace during its operation. This charge 13, of granular carbon, is preferably substantially uniformly sized and may be granular calcined carbon of uniformly porous character which may be formed by calcining at high temperature, preferably in the presence of carbon dioxide, the dissolved vegetable matter contained, for instance, in the waste soda liquors formed when paper pulp is made by the caustic soda process; although generally similar carbonized material may be formed from the waste liquors from the sulphite wood pulp process. Such light uniformly porous carbon or other carbonized material or charcoal of various grades is preferably purified by acid washing or similar treatments before being fed into the electric furnace where it is brought to the high heat of 900° C. more or less and treated with steam, carbon dioxide or other treating gases in various proportions for fifteen to thirty minutes, more or less, depending upon the temperature and treating gases employed so that the hydrocarbon or complex carbon components are destroyed or eliminated and the subsequent activation of the carbon greatly facilitated. Such high temperature treatment has been found decidedly beneficial for this purpose, and in many cases even where no steam injection is used carbon under such high temperatures flames up and burns with a whitish flame when limited quantities of oxygen are admitted and this flame deposits water on a cold surface placed above it, thus indicating that hydrocarbons or other carbon compounds containing hydrogen are being eliminated by this treatment.

In order to heat the carbon to this high temperature in a substantially uniform manner, it is advantageous to use heating electrodes which may comprise the upper electrode 16, having a series of narrow radially projecting arms so as to give ample electric contact with the carbon and yet not interfere unduly, especially on the outside of the furnace chamber, with the upward gas currents which may be used to agitate the granular carbon and remove treated portions thereof from time to time. This upper electrode 16 may be advantageously formed of relatively infusible resistant metal and connected by the stem 68 with the removable furnace cover 21, the chain or suspending member 69 preferably having insulating links or members serving to raise this upper electrode when required during the operation of the furnace, as is described in somewhat greater detail in our copending application Serial No. 537,571, filed February 18, 1922. The furnace may be provided with a lower rotary blast electrode 4 of hollow resistant metal which may have a perforated upper face 5, provided with a series of apertures through which may issue steam jets into the furnace chamber as indicated by the arrows. This electrode, together with its connected hollow stem 6, may be rotated by the gearing 10, and steam or other treating gases may be supplied to this stem through the pipes 8, 9 and the packing joint 7, an upper bearing 67 being preferably provided for the stem adjacent the lower electrode 4. A free space 11 may be provided below this rotary electrode, and to remove clinker etc. therefrom a cleanout or discharge passage such as 14 may be provided and a gate valve 15 installed therein which may be slightly opened where small quantities of air are to be admitted to the furnace. A peep hole 22 may also be provided as indicated or at other parts of the furnace chamber. The lower electrode 4 may be rotated at the desired rate of four to ten revolutions per minute, more or less, while the steam or other injecting fluid may issue through the nozzle openings in its upper surface so as to promote the uniform agitation and treatment of the furnace charge. At the same time, the heating currents supplied to these electrodes pass through the intervening carbon particles so as to develop heat therein by their resistance and such arcing action as may take place during the agitation of the charge. This electric heating should be sufficient in connection with the heat which may be developed by oxidation of the carbon material where more or less oxidizing gases are used for the injection treatment to raise the carbon at least in the active zone of the furnace to suitable refining temperatures of 800 to 950° C. more or less, the steam or other treating and separating gases agitating and carrying up the carbon particles in a boiling agitated mass, the lighter particles at least being projected considerably above the upper electrode 16 so as to separate perhaps in connection with the chemical action taking place in this mass of porous carbon, the lighter or outer more friable portions of carbon which have been treated to a greater extent. These smaller and lighter carbon particles may thus be carried up by the jets or currents of treating gases so as to be carried out of the furnace chamber through the discharge passage or conduit communicating with the centrifugal or other suitable separator 2. As shown in the drawing, a multiple passage may be used between these elements by providing passages, 23, 25, 27, each of which is controlled by valves or doors 24, 26 and 28, so that the carbon may be withdrawn from any desired level near the top 20 of the furnace chamber. As indicated in the drawing, the two upper valves are swung into their open horizontal position so as to leave the two upper passages 23, 25 open to take off the upper suspended carbon particles which are carried over into the separator and given a more or less rotary motion around the outer compartment 29 thereof outside the cylindrical baffle 30 so that the carbon particles tend to fall into the lower collecting cone 60 so as to pass into the vertical chute 34. The gas currents are allowed to pass at low speed around the lower edge of this baffle 30 and past one or more other baffles, such as 32, held as by the supports 33 in this central space communicating with the flue 31 up which the heated air and very light ash particles are carried during the operation of the furnace. The carbon, which has been given this high temperature preliminary treatment, thus collects in the vertical chute 34 which is preferably provided with a counter-weighted or automatic feed valve 35 which may have a weighted arm 36 so as to nearly close this passage and build up a mass of carbon above the valve before the weight of the carbon forces it open sufficiently to allow the gradual feed of this treated carbon down the feed chute 37 and into the secondary low temperature activating furnace of any suitable character where it is subjected to a further activating treatment of twenty to sixty minutes more or less at temperatures of about 350 to 450° C. or so in the presence of limited amounts of air or other more or less oxidizing gases.

The secondary or activating electric furnace for treating the carbon may advantageously be of the rotary kiln type and the carbon may be fed into it before or after the carbon has been allowed to cool after its treatment in the preliminary refining furnace. This secondary furnace may have a shell 38 of sheet steel or other metal mounted on suitable tires such as 40, 41 which are supported and rotated by the trunnion rolls 42 rotated in any desired way as by the shafts 57 so as to slowly rotate the shell which is preferably mounted in a slightly inclined position so as to promote the gradual feed of the mass of powdered or granular carbonized material longitudinally through the furnace. The shell ends may be formed with relatively small central openings such as 58, 59 to allow the feed and discharge of the granular carbon and also to allow a limited amount of air or other oxidizing treating gases to pass through the furnace;

and it is usually sufficient for these purposes to have these central openings about a third or a quarter of the diameter of the shell. Any suitable heating means may be used to maintain the carbon in this secondary activating furnace at the desired moderate activating temperature of 350 to 500° C. more or less, and internal heating elements are desirable for this purpose such as the heating rods or electrodes 54, an annular series of which may be arranged around the inside of the furnace adjacent the shell and supplied with heating currents at different potential from the adjacent electrodes or shell. Steel or other oxidation resisting metal rods are desirable for these heating electrodes, and they may be supported so as to be several inches or more from the inside of the metal shell and more or less parallel thereto while insulated therefrom by running the ends of these rods through suitable porcelain or other insulators 50, 51 which may have enlarged heads 55, 52 outside of the shell ends so as to maintain the proper longitudinal position of these rod electrodes, in connection with the nuts 49, 53. The heating current may be conveniently carried by a slip ring or contact element such as 47 having a flange 48 tightly bolted to one end of each of these rods as by the nuts 49 so that one or more brushes 45 may carry the current from the leads 56 into this slip ring and the heating rods or electrodes. The steel shell may conveniently constitute the other cooperating electrode and the current may be supplied thereto by one or more contact brushes 44 engaging one of the tires 40, for instance, so as to complete the heating circuit through the generator or transformer, not shown, which is connected between the connected lead 43 and the cooperating lead 56. In this way these heating rods or electrodes 54 may be maintained at a suitable difference of potential from the adjacent portions of the furnace shell, so that wherever at the lower part of the furnace the granular carbon 39 comes in contact with these electrodes heating currents pass through the carbon so as to directly heat it through the resistance of the carbon particles themselves and the arcing action taking place between them. In some cases where the granular or finely divided carbon is supplied to this activating furnace in relatively cool condition it is desirable to have the heating electrodes at the feed end of the furnace nearer the furnace shall to compensate for the greater electrical resistance of the cool carbon, or this may be taken care of by using auxiliary initial electrodes 64 in the form of rods or bars of steel, etc., riveted or otherwise attached to the inside of the furnace shell and projecting up an inch or more toward the adjacent heating elements 54 in this feed end of the furnace. By bending these auxiliary electrodes up more or less toward the main heating rods the desired current density can be secured throughout the first foot or two of the furnace where the carbon is relatively cold, and thereafter its lower specific resistance promotes the passage of the heating currents therethrough. This furnace may be of any suitable diameter and length and with a furnace four or five feet in diameter and eight to twelve feet long more or less the rotation of the furnace may be such as to discharge the activated carbon after it has been treated in the furnace twenty to sixty minutes more or less, depending upon the heat and treating gases to which it is subjected. The discharge end of the furnace may advantageously be provided with a restricted discharge throat 46 discharging the activated carbon beyond the slip ring 47 into any suitable receiver or discharge casing 65 which may have an air inlet opening 66 so that the carbon after being discharged is preferably kept out of undesirable contact with air or oxidizing gases until it is at last considerably cooled.

In operating this apparatus the porous carbonized material from soda waste liquor, for instance, after it has been leached and also acid washed, if desired, may be continuously fed into the preliminary treating furnace and subjected to the high temperature treatment for twenty or thirty minutes or more where the temperature is about 850 to 900° C. and where superheated steam at five to ten pounds or so pressure is used as the treating agitating and separating gas. Then this treated and refined carbon may be run, while still considerably heated from the separator, into the secondary activating furnace where it may advantageously be subjected to an oxidizing activating treatment for thirty or forty minutes more or less at a temperature of about 400° C. This makes it possible to secure considerably higher yields of highly effective decolorizing carbon as compared to producing substantially the same grade of carbon at a high heat treatment, so that an increased production of thirty or forty per cent, can thus be secured. Furthermore, where steam is used as the treating gas in the preliminary refining treatment of the carbon, reducing conditions are usually maintained in this preliminary high temperature furnace so that the usual sulphates present in the carbon are to a large extent reduced to sulphides and other salts having an alkaline reaction. A large proportion of this inorganic matter may furthermore be eliminated in this high temperature refining treatment, part of the inorganic matter or ash fusing together to form clinkers while smaller portions form extremely fine ash particles which are carried entirely away by the gas currents, so that in these ways the ash content of the carbon is often reduced to fifty per cent or so of its original value; although in some cases where high ash content is unobjectionable in the finished decolorizing carbon the high temperature refining treatment may be carried out in other ways and without such steam or gas jet injection. In the secondary activating furnace where the refined carbon is exposed to air or other oxidizing gases at relatively low temperatures of say about 400° C. or so for thirty to forty minutes, the sulphide components are usually quite completely oxidized to sulphates which are not seriously objectionable for many uses of the decolorizing carbon; and furthermore, this makes it possible to produce a carbon which is almost entirely neutral, so as not to have objectionable acid action when used on sugar and other solutions where inversion losses sometimes take place with carbon that has been acid washed to eliminate its alkaline reaction.

This invention has been described in connection with a number of illustrative forms, sizes, elements, parts, apparatus, materials, conditions, pressures, temperatures and times of treatment, to the details of which disclosure the invention is not of course to be limited; since what is claimed as new and what is desired to be covered by Letters Patent is set forth in the appended claims.

1. The continuous process of activating porous granular decolorizing carbon formed from dissolved vegetable material, which comprises heating the carbon particles to high temperatures of about 800 to 900° C. and injecting reducing treating gases into a mass of such carbon particles to agitate the same and separating therefrom some of said treated carbon particles, and continuously agitating and subjecting a mass of such treated carbon particles to the action of limited amounts of air or activating gases while maintained at a considerably lower temperature of about 350 to 450° C. to activate the carbon while minimizing oxidation losses thereof.

2. The continuous process of activating porous granular decolorizing carbon, which comprises heating the carbon particles to high temperatures of about 800 to 900° C. and injecting reducing treating gases into a mass of such carbon particles to agitate the same and separating therefrom some of said treated carbon particles, and agitating and subjecting a mass of such treated carbon particles to the action of limited amounts of air or activating gases while maintained at a considerably lower temperature to activate the carbon while minimizing oxidation losses thereof.

3. The continuous process of activating porous decolorizing carbon, which comprises heating the carbon particles at high temperatures of about 800 to 900° C. and eliminating objectionable organic components therefrom and agitating and subjecting a mass of such treated carbon to prolonged activating action while maintained at considerably lower temperatures to highly activate the carbon while minimizing oxidation losses.

4. The continuous process of activating porous decolorizing carbon, which comprises heating the carbon particles at high temperatures of over 800° C. and eliminating objectionable organic components therefrom and subjecting a mass of such treated carbon to prolonged activating action while at considerably lower temperatures to highly activate the carbon while minimizing oxidation losses.

5. The process of making decolorizing carbon which comprises heating granular carbonized material at high temperatures of over 800° C. to eliminate objectionable organic components and subjecting the treated carbon to activating action for at least about half an hour in the presence of activating gases at lower temperatures to highly activate the treated carbon with relatively small oxidation losses.

6. The process of producing decolorizing properties in finely divided carbon which comprises heating the material by passing electric currents therethrough in an atmosphere of relatively limited oxidizing efficiency to refine the carbon, and then in heating the material by passing electric currents therethrough in an atmosphere of relatively greater oxidizing efficiency to activate the carbon.

7. The process of making decolorizing carbon which comprises heating granular carbonized dissolved organic material to high temperatures of over 900° C. until objectionable complex carbon or hydrocarbon components are eliminated and subjecting the treated carbon to prolonged action of limited quantities of oxidizing gases at considerably lower temperatures of about 400° C. to activate the treated carbon with relatively small oxidation losses.

8. The process of making decolorizing carbon which comprises heating granular carbonized dissolved organic material to high temperatures of about 900° C. or over to eliminate objectionable complex carbon or hydrocarbon components and subjecting the treated carbon to prolonged action of limited quantities of oxidizing gases at considerably lower temperatures to activate the treated carbon.

9. The process of making decolorizing carbon which comprises heating porous carbonized material to high temperatures of over 800° C. to eliminate objectionable complex carbon or hydrocarbon components and subjecting the treated carbon to prolonged action of limited quantities of gases comprising carbon dioxide at considerably lower temperatures of about 400° C. to activate the treated carbon.

10. The process of making decolorizing carbon which comprises heating porous carbonized material to high temperatures of over 800° C. to eliminate objectionable components and subjecting the treated carbon to prolonged action of gases comprising carbon dioxide at considerably lower temperatures of about 400° C. to activate the treated carbon.

11. The process of making decolorizing carbon which comprises heating porous carbonized material to high temperatures to eliminate objectionable components and subjecting the treated carbon to prolonged action of gases comprising carbon dioxide at about half as high activating temperatures to activate the treated carbon.

12. The process of making decolorizing carbon which comprises heating granular carbonized material at high temperatures of over 800° C. under reducing conditions to eliminate objectionable hydrocarbon components and subjecting the treated carbon to prolonged oxidizing action of limited quantities of activating gases at considerably lower temperatures of about 400° C. to produce highly decolorizing carbon which is substantially neutral chemically.

13. The process of making decolorizing carbon which comprises heating carbonized material at high temperatures under reducing conditions to eliminate objectionable hydrocarbon components and subjecting the treated carbon to prolonged oxidizing action of limited quantities of activating gases at considerably lower temperatures to produce highly decolorizing carbon which is substantially neutral chemically.

14. The process of producing decolorizing properties in finely divided leacher refuse carbon which comprises heating the material by passing electric currents therethrough at a relatively high temperature in an atmosphere of relatively limited oxidizing efficiency, and then in heating the material by passing electric currents therethrough at a lower temperature in an atmosphere of greater oxidizing efficiency.

15. A process for activating carbon, comprising mechanically agitating a mass of adsorptive carbon particles in an oxidizing atmosphere, while heating the same by passing electric currents therethrough, sufficiently to increase the activity of the adsorptive carbon particles without causing serious destruction of the carbon by oxidation.

16. The electric furnace apparatus for treating decolorizing carbon, comprising a substantially vertical furnace chamber provided with a lower rotary electrode and means for discharging jets of treating and separating gases through the furnace charge, a cooperating upper heating electrode adapted to heat the furnace charge to temperatures of about 900° C., the upper part of the furnace being formed with a plurality of vertically separated discharge passages, a separator communicating with said discharge passages to receive suspended treated carbon therefrom and discharge said treated carbon while still hot into a feed chute, a secondary electric furnace communicating with said feed chute and formed with a series of heating electrodes extending adjacent the furnace shell and maintained at different potential therefrom to thereby agitate and heat the treated carbon at temperatures of about 400 to 500° C. in the presence of limited amounts of air or oxidizing gases to activate the carbon.

17. The electric furnace apparatus for treating decolorizing carbon, comprising a furnace chamber provided with a lower rotary electrode and means for discharging jets of treating and separating gases through the furnace charge, a cooperating upper heating electrode adapted to heat the furnace charge to temperatures of about 900° C., the upper part of the furnace being formed with a plurality of vertically separated discharge passages, a separator communicating with said discharge passages to receive suspended treated carbon therefrom and discharge said treated carbon into a feed chute, a secondary electric furnace communicating with said feed chute to agitate and heat the treated carbon and activate the same.

18. The apparatus for activating decolorizing carbon, comprising an electric furnace having heating means adapted to heat the carbon to temperatures of 800° C. or more, means including gaseous jets to agitate the hot carbon and remove treated portions therefrom, a separator communicating with said furnace and an electric furnace receiving such hot treated carbon from said separator and agitating the same in the presence of limited amounts of activating gases at relatively lower activating temperatures.

19. The apparatus for activating decolorizing carbon, comprising a furnace having heating means adapted to heat the carbon to temperatures of 800° C. or more, means to agitate the hot carbon and remove treated portions therefrom, a separator communicating with said furnace and an electric furnace receiving such hot treated carbon from said separator and agitating the same in the presence of limited amounts of activating gases at relatively lower activating temperatures.

20. The apparatus for activating decolorizing carbon, comprising a preliminary furnace having heating means adapted to heat the carbon to high temperatures of 800° C.

or more and eliminate objectionable organic components therefrom, means including gaseous jets to agitate the hot carbon and remove treated portions from said furnace, and an electric furnace receiving such treated carbon from said preliminary furnace and agitating and activating the same in the presence of limited amounts of activating oxidizing gases at relatively lower activating temperatures.

21. The apparatus for activating decolorizing carbon, comprising a preliminary furnace having heating means adapted to heat the carbon to high temperatures and eliminate objectionable organic components therefrom, means to agitate the hot carbon and remove treated portions from said furnace, and an electric furnace receiving such treated carbon from said preliminary furnace and activating the same in the presence of limited amounts of activating gases at relatively lower activating temperatures.

22. The rotary electric furnace for treating decolorizing carbon comprising an inclined cylindrical steel shell formed with supporting tires and means to rotate the shell and supply electric current thereto, a series of heating electrodes extending longitudinally through the furnace adjacent the inner surface of the shell and insulated therefrom, and insulating them from the shell, a contact ring adjacent the discharge end of the shell and electrically connected to said electrodes cooperating means to supply current to said contact ring and electrodes while the furnace rotates, and auxiliary initial electrodes secured to the furnace shell adjacent the inlet end of the furnace and projecting up toward the longitudinal heating electrodes to reduce the effective distance between oppositely charged electrodes adjacent the inlet end of the furnace.

23. The rotary electric furnace for treating decolorizing carbon comprising a metallic shell and means to rotate the shell and supply electric current thereto, a series of heating electrodes extending longitudinally through the furnace adjacent the inner surface of the shell and insulated therefrom, and cooperating means to supply current to said electrodes while the furnace rotates, and auxiliary initial electrodes secured to the furnace shell adjacent the inlet end of the furnace and projecting up toward the longitudinal heating electrodes to reduce the effective distance between oppositely charged electrodes adjacent the end of the furnace.

24. The rotary electric furnace for treating decolorizing carbon comprising a metallic shell, means to rotate the shell and supply electric current thereto, a series of exposed heating electrodes extending longitudinally through the furnace adjacent the inner surface of the shell, cylindrical insulators engaging the ends of said shell and supporting said electrodes and insulating them from the shell, cooperating means to supply current to said electrodes while the furnace rotates to thereby pass heating currents through the carbon engaging said electrodes.

25. The rotary electric furnace for treating decolorizing carbon comprising a shell, means to rotate the shell, a series of exposed heating electrodes extending longitudinally through the furnace adjacent the inner surfaces of the shell, cylindrical insulators engaging the ends of said shell and supporting said electrodes and insulating them from the shell, cooperating means to supply current to said electrodes while the furnace rotates to thereby pass heating currents through the carbon engaging said electrodes.

26. The process of treating comminuted carbonaceous and like material, which comprises passing such material from one heating zone to another heating zone of lesser heat intensity, said zones being open to the air.

27. The process of treating comminuted carbonaceous and like material, which comprises passing such material from one heating zone to another heating zone of lesser heat intensity and stirring such material.

28. The process of treating comminuted carbonaceous or like material, which comprises subjecting such material to the successive action of varying degrees of heat in the presence of an oxidizing gas.

29. The process of treating comminuted carbonaceous or like material, which comprises subjecting such material to the successive action of diminishing degrees of heat in the presence of air.

30. The process of treating comminuted carbonaceous or like material, which comprises continuously advancing and stirring such material while subjecting such material to the successive action of diminishing degrees of heat in the alternate presence of oxidizing gas and steam.

LEONARD WICKENDEN.
STANLEY A. W. OKELL.